A. A. MANSELL & G. SMITH.
APPLIANCE FOR PREVENTING SIDE SLIPPING OF WHEELS ON MOTOR VEHICLES.
APPLICATION FILED MAR. 30, 1908.
949,190.
Patented Feb. 15, 1910.
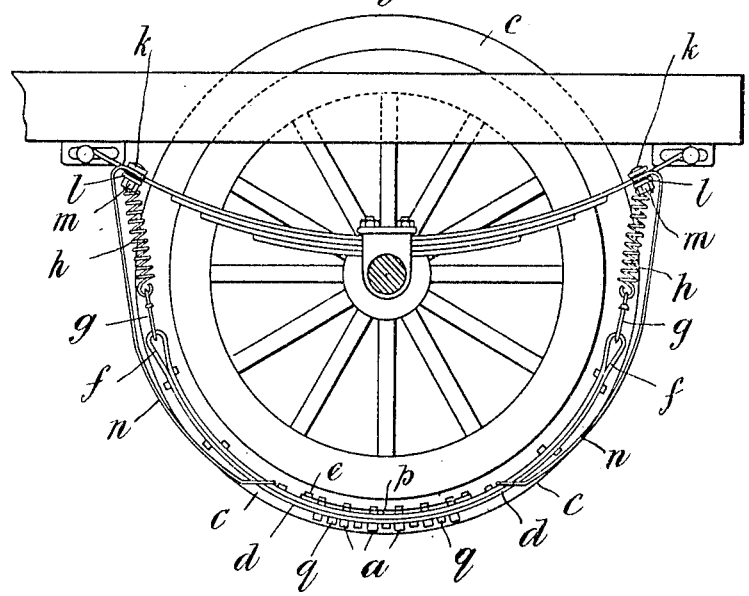
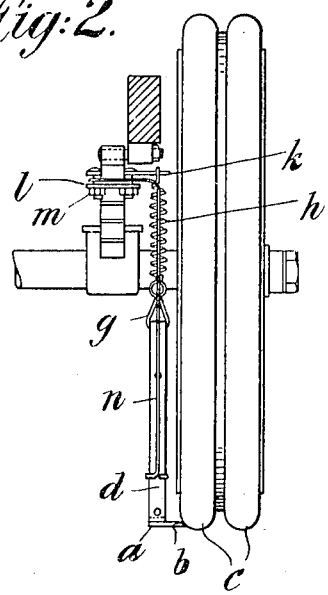
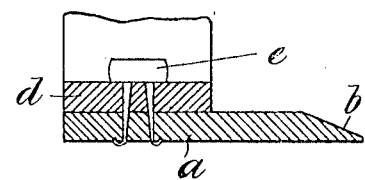
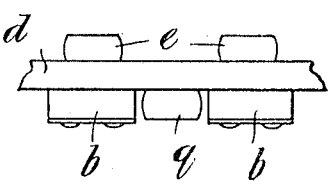
Witnesses
Edwin D Bartlett
Abbott Beale
Inventors
Alfred Albert Mansell and George Smith
per Herbert Sefton Jones
Attorney

UNITED STATES PATENT OFFICE.

ALFRED ALBERT MANSELL, OF LONDON, AND GEORGE SMITH, OF CHELSEA, LONDON, ENGLAND.

APPLIANCE FOR PREVENTING SIDE SLIPPING OF WHEELS ON MOTOR-VEHICLES.

949,190.

Specification of Letters Patent.    Patented Feb. 15, 1910.

Application filed March 30, 1908. Serial No. 424,104.

*To all whom it may concern:*

Be it known that we, ALFRED ALBERT MANSELL, motor mechanic, a subject of the King of Great Britain, residing at 26 Portman Mews North, Portman Square, in the city and county of London, England, and GEORGE SMITH, motor mechanic, a subject of the King of Great Britain, residing at 94 Church street, Chelsea, in the county of London, England, have invented a new and useful Appliance for Preventing Side Slipping of Wheels on Motor-Vehicles and the Like, of which the following is a specification.

This invention relates to means for preventing side slip on motor cars and like vehicles, and consists in the provision of a flat plate or strip of material suspended from the frame of the vehicle and lying close to the ground and close against the side of the vehicle wheel, in such manner that as soon as the wheel begins to move sidewise it mounts upon the plate or strip pressing this against the ground.

One form of construction of the invention is illustrated in the accompanying drawings in which—

Figure 1 is a side view and Fig. 2 an edge view of the vehicle wheel to which the invention has been applied. Fig. 3 shows the plate or strip above mentioned, and Fig. 4 is a sectional detail view thereof.

In the form of construction illustrated in the drawings instead of a single plate of material, a number of separate strips $a$ are employed. The material is preferably chrome leather, raw hide or the like, but it may be hoop iron or any other material which is sufficiently flexible and also sufficiently strong for the purpose. The strips $a$ are, as shown in Figs. 2 and 4, beveled at the edge $b$ which is intended to lie close against and even beneath the curve of the tire $c$ of the vehicle wheel. The separate strips $a$ are secured transversely upon a long strap $d$ which may also be of chrome leather or the like by means of studs or bolts $e$ which, in the example shown, consist of a head carrying two pointed prongs adapted to be bent over after penetrating the material. Naturally this method of fastening may be replaced by any other of the known methods. The strap $d$ is doubled on itself or has loops $f$ formed at its end by which it is suspended preferably from the bow spring which supports the car body. In order that the device may be readily attached to or removed from a vehicle, a method of securing it like that illustrated may well be employed. The loops $f$ are engaged by metal loops $g$ which are shown in Fig. 2 as having rounded ends but are preferably made with flat ends so that the strap $d$ does not get displaced from its proper position. These metal loops $g$ are attached by means of a swivel joint to spring $h$ which latter is joined to one end of a metal plate $k$. This link is placed above the spring and beneath it is arranged a shorter plate $l$ secured to the first by two bolts or the like $m$ passing through it and through slots in the lower plate; by this means the plate $k$ may be readily adjusted laterally on loosening the bolts $m$. In order to assist still further in maintaining the strips $a$ in their proper relative position, a metal guide $n$ may be provided. This is preferably formed from stout wire which is looped at the top and gripped between the plates $k$, $l$, while at the bottom it surrounds the strap $d$. If desired this guide may be permanently connected with the plate $k$ so as to move together with them in lateral adjustment.

At the bottom where the strips $a$ are attached the strap $d$ should preferably be reinforced by the addition of another strip $p$ behind it, as shown in Fig. 1; or instead a strip of hoop iron may be secured between the layers of the strap $d$. Further, between the strips $a$ protecting rivets or the like $q$ may be secured in the strap, and these projecting between the strips, save some amount of wear between the strips and the roadway. If desired, the rivets $e$ may be inserted with their heads on the outside and these then serve themselves to save wear, while as they cant the strips $a$, the edges $b$ remain as close to the ground as before.

The manner in which the device acts will be readily understood and has already been outlined in the above. As stated the strips $a$ lie as close as practicable to the ground and also to the vehicle wheel. Preferably the beveled ends $b$ are arranged to lie actually beneath the curve of the tire. When, then, the vehicle wheel moves laterally it promptly engages upon the beveled end $b$, not pushing this before it but depressing it upon the ground and riding over it. Thus an intermediate surface of different texture is interposed between the ground and the tire cover and the lateral slipping quickly ceases. Naturally as soon as the wheel resumes a straight course, that is, rolls only in its own plane, the strips *a* are released because their natural tendency is to hang from their supports just beside the wheel.

It will be quite clear that the invention is not by any means limited to the precise details that have already been described. It would be quite easy to vary the method of suspension as well as the method of adjusting that suspension. Moreover it may be found desirable to insert in some part of the suspension, say between the hook *g* and the spring, a device for adjusting the length of the suspension so that the strips *a* can be brought a little nearer to or moved a little farther from the ground if the apparatus requires adjustment. Another method of securing this adjustment is to provide a buckle in the loop of the strap *d*. These and similar modifications and additions are, therefore, to be considered within the scope of this application.

What we claim is:

1. The combination with a wheel of a vehicle, of a separate strip of material, means for supporting said strip at its two ends so that the middle is near the ground, transverse strips, and means securing said transverse strips at right angles to the suspended strip in close proximity to the wheel.

2. The combination with a wheel of a vehicle, of a separate strip of material, means for supporting said strip at its two ends so that the middle is near the ground, transverse strips with beveled edges, and means securing said transverse strips to the suspended strip in close proximity to the wheel.

3. The combination with a wheel of a vehicle, of a separate strip of material, loops at the end of said strip, extensible means engaging with said loops for supporting said strip at its two ends so that the middle is near the ground, transverse strips, and means securing said transverse strips to the suspended strip in close proximity to the wheel.

4. The combination with a wheel of a vehicle, of a separate strip of material, means for supporting said strip at its two ends so that the middle is near the ground, additional strips reinforcing said suspended strip at its middle part, transverse strips, and means securing said transverse strips to the suspended strip in close proximity to the wheel.

5. The combination with a wheel of a vehicle, of a separate strip of material, means for supporting said strip at its two ends so that the middle is near the ground, transverse strips, means securing said transverse strips at right angles to the suspended strip, and guides engaging with said suspended strip to maintain it in close proximity to the wheel.

6. The combination with the wheel and spring of a vehicle of a separate strip of material, pairs of plates secured upon the vehicle spring by bolts, and connections between said plates and the ends of the strip whereby the strip is suspended close to the ground and to the wheel.

7. The combination with the wheel and spring of a vehicle, of a separate strip of material, pairs of plates secured upon the vehicle spring by bolts, connections between said plates and the ends of the strip whereby the strip is suspended close to the ground and to the wheel, and guides secured to said plates and engaging with said strip to maintain it in position.

8. The combination with a wheel of a vehicle, of a separate strip of material, means for supporting said strip at its two ends so that the middle is near the ground, transverse strips, means securing said transverse strips to the suspended strip in close proximity to the wheel, and studs attached to said strip between the transverse strips.

In testimony whereof we have signed our names to this specification in the presence of two subscribing witnesses.

ALFRED ALBERT MANSELL.
GEORGE SMITH.

Witnesses:
HUBERT A. GILL,
A. E. ODELL.